Figure 1:
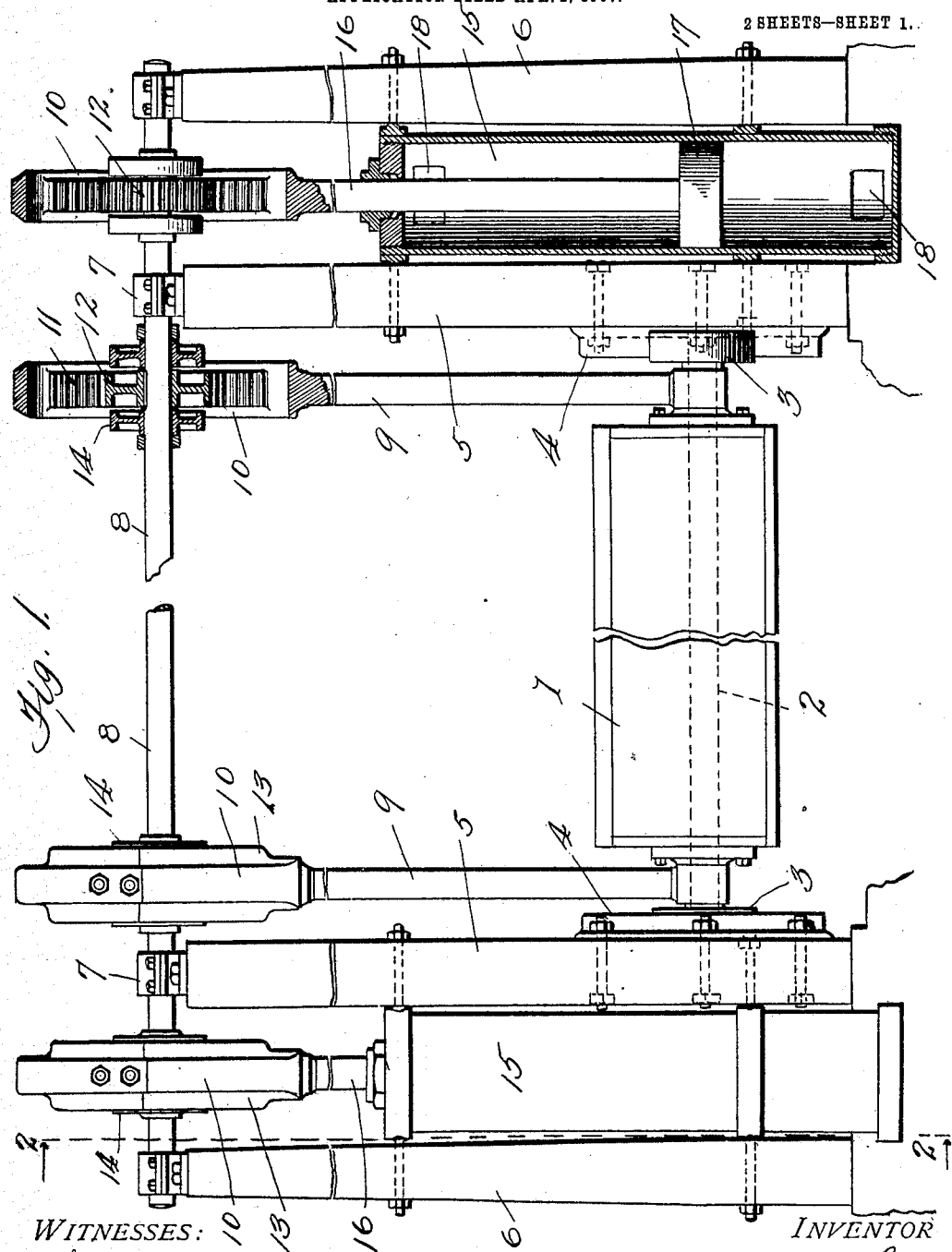

No. 860,519. PATENTED JULY 16, 1907.
J. BIRCH.
WAVE MOTOR.
APPLICATION FILED APR. 1, 1907.
2 SHEETS—SHEET 1.

WITNESSES:
Chas. T. Davis
Margaret Smith

INVENTOR
John Birch
BY
Bartlett Brock
Attorneys

No. 860,519.
PATENTED JULY 16, 1907.
J. BIRCH.
WAVE MOTOR.
APPLICATION FILED APR. 1, 1907.
2 SHEETS—SHEET 2.
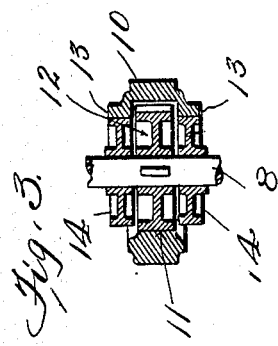
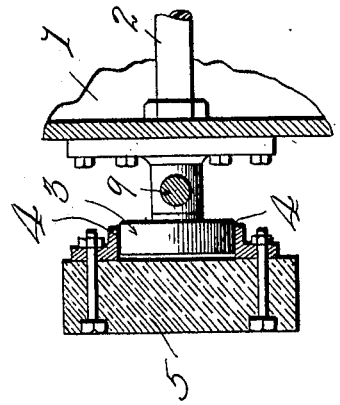
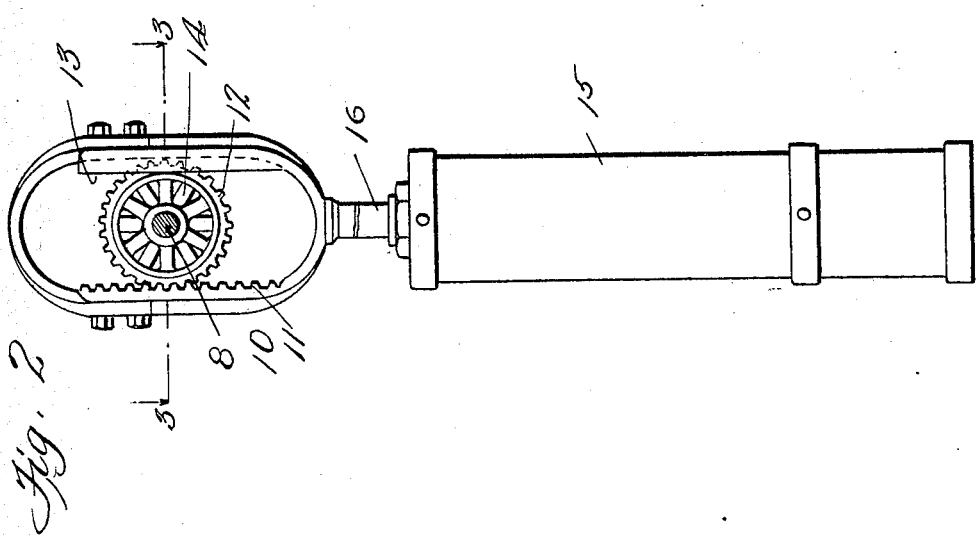
WITNESSES:
Chas. W. Davies
Margaret Smith.
INVENTOR
John Birch
BY Bartlett & Brock
Attorneys ns.
UNITED STATES PATENT OFFICE.

JOHN BIRCH, OF DAYTON, OHIO.

WAVE-MOTOR.

No. 860,519.          Specification of Letters Patent.          Patented July 16, 1907.

Application filed April 1, 1907. Serial No. 365,840.

To all whom it may concern:

Be it known that I, JOHN BIRCH, a citizen of the United States, residing at Dayton, in the State of Ohio, have invented certain new and useful Improvements in Wave-Motors, of which the following is a specification.

The object of my invention is to provide improved means for utilizing the movement of waves for power purposes.

In the preferred form of my invention I use the power derived from the movement of waves to force water to a higher level either for direct utilization or for the purpose of deriving power from the water as it descends again to its natural level.

The characteristics and advantages of the invention are hereafter fully described in connection with the accompanying drawing which illustrates an exemplification of the invention, and in which—

Figure 1 is a view partly in elevation and partly in section of mechanism embodying the invention; Fig. 2 is a side view of one of the yokes and gears; Fig. 3 is a cross section on line 3—3 of Fig. 2, and Fig. 4 is a sectional detail showing the guide mechanism for the float.

Reference numeral 1 designates a float, of suitable dimensions and of suitable material, although I prefer usually to construct it of steel, through which passes a shaft or axle 2 protruding beyond the ends of the float. On the ends of the axle are guide rollers 3 running in guides 4 which are secured to columns 5 in proper position to guide the float in its vertical movement and at different mean levels of water. In fresh water the guides are usually only about as long as the distance from the hollow to crest of a wave, but in tide water the guides are sufficiently long to permit the momentary movement of the float due to waves, and also the gradual rise and fall through a greater distance due to the tide. Columns 6, as well as columns 5, rest on suitable foundations at a proper distance below the surface of the water. The columns at their tops carry in suitable journals 7, a main shaft 8.

Connecting rods 9 are pivotally connected one at each side of the float to shaft 2 between the float and guide roller 3. These connecting rods carry at their upper ends yokes 10 which embrace shaft 8 and are provided on one side with gear racks 11 engaging gears 12, one for each yoke, keyed to shaft 8. The sides of the yokes opposite to the racks are provided with flanges 13, one on each side of the gear, and these flanges bear against pulleys 14 which are mounted revolubly on shaft 8.

As the float moves up and down under the influence of the wave movement, racks 11 rotate gears 12 in the direction corresponding to their movement, and the lateral thrust of the racks tending to move them away from the gear teeth is taken up with a minimum of friction by contact of the flanges 13 with the pulleys 14. If desired, these pulleys may be mounted on the shaft by means of ball or other anti-friction bearings. It is to be observed that the float is free not only to move vertically, but since it is mounted on axle 2 is free to oscillate so that it does not oppose rigid resistance to the wave movement, but yields more or less so that the danger of damage or breakage of the apparatus is minimized.

The movement of the shaft 8 imparted to it by the float may be utilized by it in any desired manner. I prefer, however, to provide the following means of making the movement of the shaft available: Between each pair of columns 5, 6, I secure a pump-cylinder 15 having a piston rod 16 and piston 17 and suitable ports 18 for the passage of water. At the upper ends, piston rods 16 are provided with yokes 10, which may be similar in all respects to those already described; and shaft 8 is provided with gears 12, pulleys 13 and other parts similar to those already described for each of the piston rod yokes. As shaft 8 revolves under the impulse of the float, gears 12 engaging the racks in the pump yokes 10, cause piston 17 to reciprocate a distance corresponding to the movement of the float. Any suitable valve mechanism is provided, preferably such that a partial stroke of the piston is effective to pump a proportionate amount of water and the water is carried through suitable devices to an elevated reservoir from which it is utilized in any desired manner.

By making gears 12 corresponding to the float and pumps of different diameters, different operative effects may be secured. For instance, the float gears may be larger than the pump gears and in this case the pump pistons will move through a shorter distance than the float, in other words, the pistons are geared down in relation to the float.

Other alternative arrangements and constructions will be apparent to those versed in the art without further detail description.

I claim:—

1. The combination of a float, an axle therefor, vertical supports, guides thereon for the float, rollers on the axle engaging the guides, a shaft, gears thereon, rods connected to the axle, yokes on the connecting rods having racks engaging the gears, loose pulleys on the shaft and flanges on the yokes engaging the pulleys and taking up the thrust of the gears.

2. The combination of a float, an axle, a shaft, connecting rods connected to the axle and geared to the shaft, a pump comprising a cylinder, a piston and a piston-rod and a yoke carried by the piston-rod and geared to the shaft.

3. In a wave and tide motor, the combination of a float, vertical fixed guides, an axle passing through the float and engaging the guides a shaft, gears fixed thereon, loose pulleys thereon, racks pivotally connected with the float and engaging the gears, and flanges carried by the racks and engaging the pulleys so as to take up the thrust of the racks.

4. In a wave and tide motor, the combination of fixed vertical guides, an axle engaging the guides, a float mounted on the axle so that it is free to rock about the axis of the axle a shaft, gears fixed thereon, loose pulleys thereon, racks pivotally connected with the float and engaging the gears, and flanges carried by the racks and engaging the pulleys so as to take up the thrust of the racks.

5. In a wave and tide motor, the combination of fixed vertical guides, an axle, rollers on the ends of the axle engaging the guides, a float mounted on the axle so that it is free to rock about the axis of the axle a shaft, gears fixed thereon, loose pulleys thereon, racks pivotally connected with the float and engaging the gears, and flanges carried by the racks and engaging the pulleys so as to take up the thrust of the racks.

6. In a wave and tide motor, the combination of a vertically guided, pivoted float, a shaft, gearing connecting the float and shaft so that the latter rotates in correspondence with the float in distance and direction, and a pump similarly geared to the shaft.

In testimony whereof I have affixed my signature in presence of two subscribing witnesses.

JOHN BIRCH.

Witnesses:
W. L. JAEKLE,
JAMES KNIGHT.